(12) United States Patent
Deaton

(10) Patent No.: US 7,009,370 B2
(45) Date of Patent: Mar. 7, 2006

(54) PULSE FORMING CONVERTER

(75) Inventor: Donald Joe Deaton, Huntsville, AL (US)

(73) Assignee: DRS Test & Energy Management, Inc., Huntsville, AL (US)

( * ) Notice: Subject to any disclaimer, the term of this patent is extended or adjusted under 35 U.S.C. 154(b) by 0 days.

(21) Appl. No.: 11/174,368

(22) Filed: Jul. 1, 2005

(65) Prior Publication Data

US 2005/0242793 A1    Nov. 3, 2005

Related U.S. Application Data

(63) Continuation of application No. 10/461,709, filed on Jun. 13, 2003.

(60) Provisional application No. 60/388,539, filed on Jun. 13, 2002.

(51) Int. Cl.
*G05F 1/59*    (2006.01)

(52) U.S. Cl. .................................................. 323/272

(58) Field of Classification Search ................ 323/272, 323/282, 283, 351
See application file for complete search history.

(56) References Cited

U.S. PATENT DOCUMENTS

| | | | |
|---|---|---|---|
| 3,059,126 A | 10/1962 | Hansson ..................... 307/88.5 |
| 3,191,052 A | 6/1965 | Neitzert ........................ 307/88 |
| 3,211,915 A | 10/1965 | Poehlman et al. ............. 307/88 |
| 3,303,409 A | 2/1967 | Heinrich et al. .............. 321/45 |
| 3,620,200 A | 11/1971 | Stephens et al. ............ 123/148 |
| 4,336,587 A | 6/1982 | Boettcher et al. ............ 363/134 |
| 4,378,586 A | 3/1983 | Bete ............................. 363/56 |
| 4,803,378 A | 2/1989 | Richardson .................. 307/108 |
| 4,812,770 A | 3/1989 | Dravkin ........................ 328/67 |
| 5,079,689 A | 1/1992 | Gidon et al. ................. 363/131 |
| 5,185,567 A * | 2/1993 | Uchida ......................... 323/267 |
| 5,336,864 A | 8/1994 | Martin ..................... 219/69.18 |
| 5,355,295 A | 10/1994 | Brennen ........................ 363/40 |
| 5,359,279 A | 10/1994 | Gidon et al. ................. 323/282 |
| 5,808,453 A * | 9/1998 | Lee et al. ..................... 323/224 |
| 5,936,988 A | 8/1999 | Partlo et al. ................... 372/38 |
| 6,043,634 A * | 3/2000 | Nguyen et al. ................ 323/272 |
| 6,151,346 A | 11/2000 | Partlo et al. ................... 372/38 |
| 6,211,657 B1 | 4/2001 | Goluszek ..................... 323/272 |
| 6,222,356 B1 | 4/2001 | Taghizadeh-Kaschani .. 323/288 |
| 6,281,666 B1 * | 8/2001 | Tressler et al. .............. 323/272 |
| 6,342,822 B1 | 1/2002 | So .............................. 332/109 |
| 6,366,069 B1 | 4/2002 | Nguyen et al. .............. 323/282 |
| 6,518,738 B1 | 2/2003 | Wang .......................... 323/284 |
| RE38,454 E * | 3/2004 | Walters et al. ............... 323/272 |
| 6,801,026 B1 * | 10/2004 | Schrom et al. .............. 323/272 |
| 6,836,103 B1 * | 12/2004 | Brooks et al. ............... 323/282 |
| 2002/0140407 A1 | 10/2002 | Hwang ........................ 323/207 |

* cited by examiner

*Primary Examiner*—Jeffrey Sterrett
(74) *Attorney, Agent, or Firm*—Russell Carter Gache Sirote & Permutt, P.C.

(57) ABSTRACT

A scalable, interleaved pulse forming converter is disclosed having two Buck switching converter modules each contributing half to the total load of the circuit to produce a programmable current pulse. Synchronization pulses to the two modules are set 180 degrees out of phase of each other to reduce ripple current. The invention is susceptible to various interleaved modifications to further reduce ripple current and increase power, as well as to electrically isolate the load from input or battery ground.

14 Claims, 11 Drawing Sheets

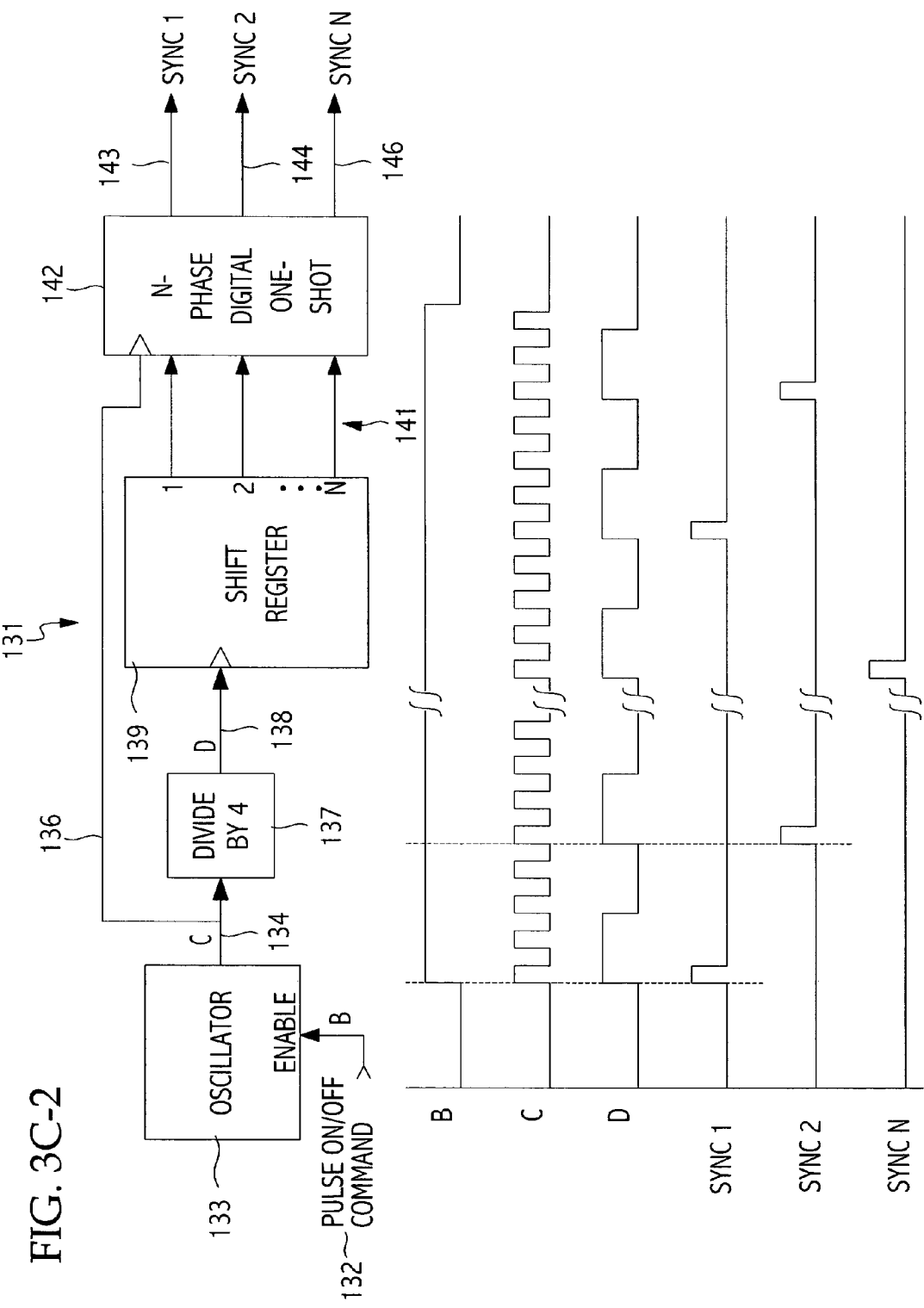

PULSE FORMING CONVERTER

This application claims the benefit of filing priority under 35 U.S.C. §119 and 37 C.F.R. §1.78 of the co-pending U.S. Provisional Application Ser. No. 60/388,539 filed Jun. 13, 2002, for an Improved Pulse Forming Converter and is a continuation of U.S. Non-provisional application Ser. No. 10/461,709 filed Jun. 13, 2003, for an Improved Pulse Forming Converter. All information disclosed in those prior pending provisional and non-provisional applications is incorporated herein by reference.

FIELD OF THE INVENTION

The present invention relates generally to pulse forming networks. In particular, the present invention relates to pulse forming converters and pulse generating interleaved converters.

BACKGROUND OF THE INVENTION

A Pulse Forming Converter ("PFC") is an electronic circuit that generates high power current pulses or voltage pulses that are delivered to an electrical load. Part of the goal of a PFC is to shape electrical pulses in terms of amplitude, pulse width, and duty cycle. PFC's are utilized to drive a variety of loads, including resistive loads, leading and lagging power factor loads and non-linear loads such as high power laser diodes. However, currently many types of PFC's operate with relatively low efficiency, and some even require a great deal of cooling support hardware.

Designers of PFC's esteem the following characteristics of PFC's, which heretofore have been elusive to achieve with today's circuits:
1. Generate current pulses (or voltage pulses) with precisely controlled amplitude and/or pulse width;
2. Programmable pulse amplitude;
3. Programmable pulse width;
4. Programmable duty cycle or repetition rate;
5. High efficiency;
6. Lightweight;
7. Fast pulse rise time and fall time;
8. Low current ripple;

FIG. 1 shows a linear pulse generator 10 that is a foundation example of the elements in a PFC. It consists of an amplifier which is a control mechanism 11 having a current command input 11a, a current sense device 12, a power transistor 13 and a power source 14 shown as a battery. The amplifier uses feedback to compare the sensed current with a current command and adjusts the drive to the power transistor to obtain the desired pulse amplitude and pulse width at the load. Such loads 16 may vary, but are shown in the Figure as a series of laser diodes. For clarity of discussion, FIG. 1A shows a typical current pulse with portions defined that are important characteristics for a PFC.

One undesirable characteristic of linear pulse generators is high power dissipation. The power dissipated in the power transistor is equal to the product of the voltage across the transistor switch 13 times the load current 17. This high power dissipation limits the amount of power that can be obtained from this device. Cooling hardware that is heavy and occupies a large volume may even be needed to maintain an acceptable operating temperature in the power transistor 13.

FIG. 2 shows a good example of pulse forming network 20 utilizing a Buck switching converter. The Buck switching converter shown is used to regulate direct current (DC) in a load by regulating a DC current to a load 21 that is equal to a steady state commanded current. The load 21 can be a resistor, or a reactive load such as a resistor and capacitor in parallel. It can also be any of several electrical devices including DC motors and laser diodes. The power source 22 is shown as a battery 23 with series resistance Rs 24. The power can be from other sources including a DC generator or rectified utility power. Capacitor C1 26 reduces ripple on input voltage Vin 27.

Operation of the Buck switching converter is as follows. An oscillator 28 sends out pulses at a fixed frequency. The first pulse sets the output Q 29 of the flip/flop 31 high. This turns on transistor switch 32, which is shown as a bi-polar transistor, but may be other suitable transistors such as field effect transistors ("FETs") or power MOSFETs. A voltage equal to (Vin−Vo) is applied across the inductor L1 33. The current in L1 increases at a rate defined by (Vin−Vo)/L1.

The current in the transistor switch is measured by current sensor 34. The sensed current is compared to current established by commanded current 36 at comparator 37. When the sensed current exceeds the commanded current, the output of the comparator 37 resets the output Q 29 of the flip/flop 31 to a low value that turns off the transistor switch 32. Diode D1 38 conducts and provides a path for current to continue to flow through the inductor to the load 21 after switch 32 has been turned off. With the transistor 32 off, the inductor current decreases at a rate of Vo/L1.

When the next pulse is sent by the oscillator 28, the transistor 32 is turned on and the process repeats. In this way, the Buck switching converter 20 can regulate peak current into a load. This control method is known as "pulse-width-modulation" because the "on" time of the transistor is modulated to control the output.

The Buck switching converter 20 can be used as a pulse generator by gating it on and off. An advantage of the Buck switching converter 20 over the linear pulse generator 10 is high efficiency. Because the transistor switch is either ON or OFF, it has low power dissipation. This reduces the cooling requirement.

A disadvantage of the Buck switching converter pulse generator 20 is slow rise time. The pulse rise time is inversely proportional to the inductor value. In other words, decreasing the value of L1 reduces rise time. The penalty for decreasing the value of L1 is increased load ripple current.

Therefore, what is needed is a pulse forming converter that has improved efficiency over existing designs while maintaining fast waveform rise times, low ripple current in the load, and low weight and size.

SUMMARY OF THE INVENTION

In summary, the present invention comprises a scalable, interleaved pulse forming converter having 2 Buck switching converter modules each contributing half to the total load of the circuit. Synchronization pulses to the two modules are set 180 degrees out of phase of each other to reduce ripple current. Additional embodiments are shown in which module interleaving may be utilized to further reduce ripple current and increase power, as well as to electrically isolate the load from input or battery ground.

Other features and objects and advantages of the present invention will become apparent from a reading of the following description as well as a study of the appended drawings.

BRIEF DESCRIPTION OF THE DRAWINGS

A pulse forming converter incorporating the features of the invention is depicted in the attached drawings which form a portion of the disclosure and wherein:

FIG. 3A-1 is an example of a synchronization controller for the circuit diagram in FIG. 3A with comparable waveforms;

FIG. 3C-1 is an example of a synchronization controller for the circuit diagram in FIG. 3C with comparable waveforms;

FIG. 3C-2 is another example of a synchronization controller for the circuit diagram in FIG. 3C with comparable waveforms;

DESCRIPTION OF THE PREFERRED EMBODIMENTS

Figure 3A:
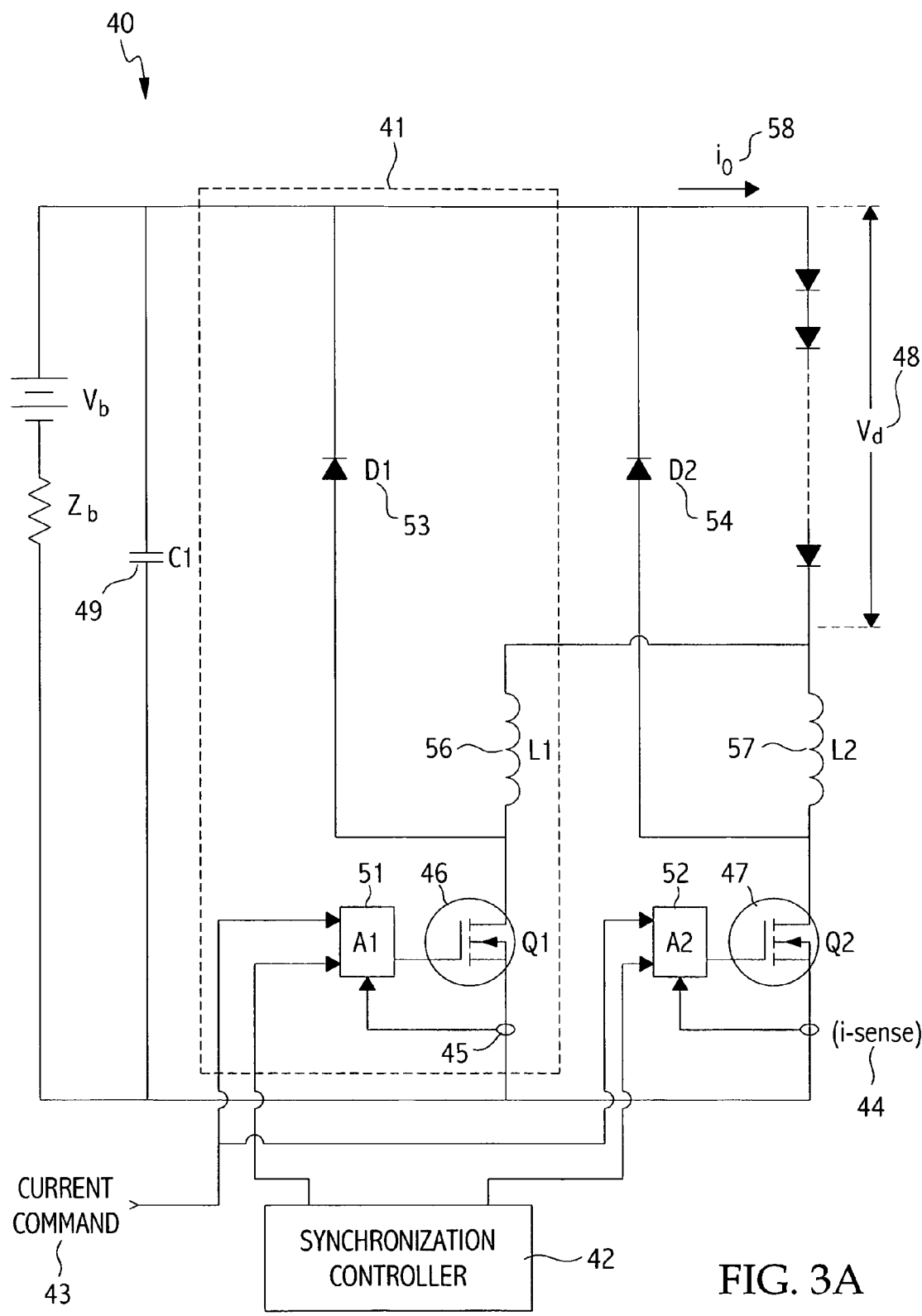
FIG. 3A is a circuit diagram of an improved pulse forming converter.
Figures 1, 3A:
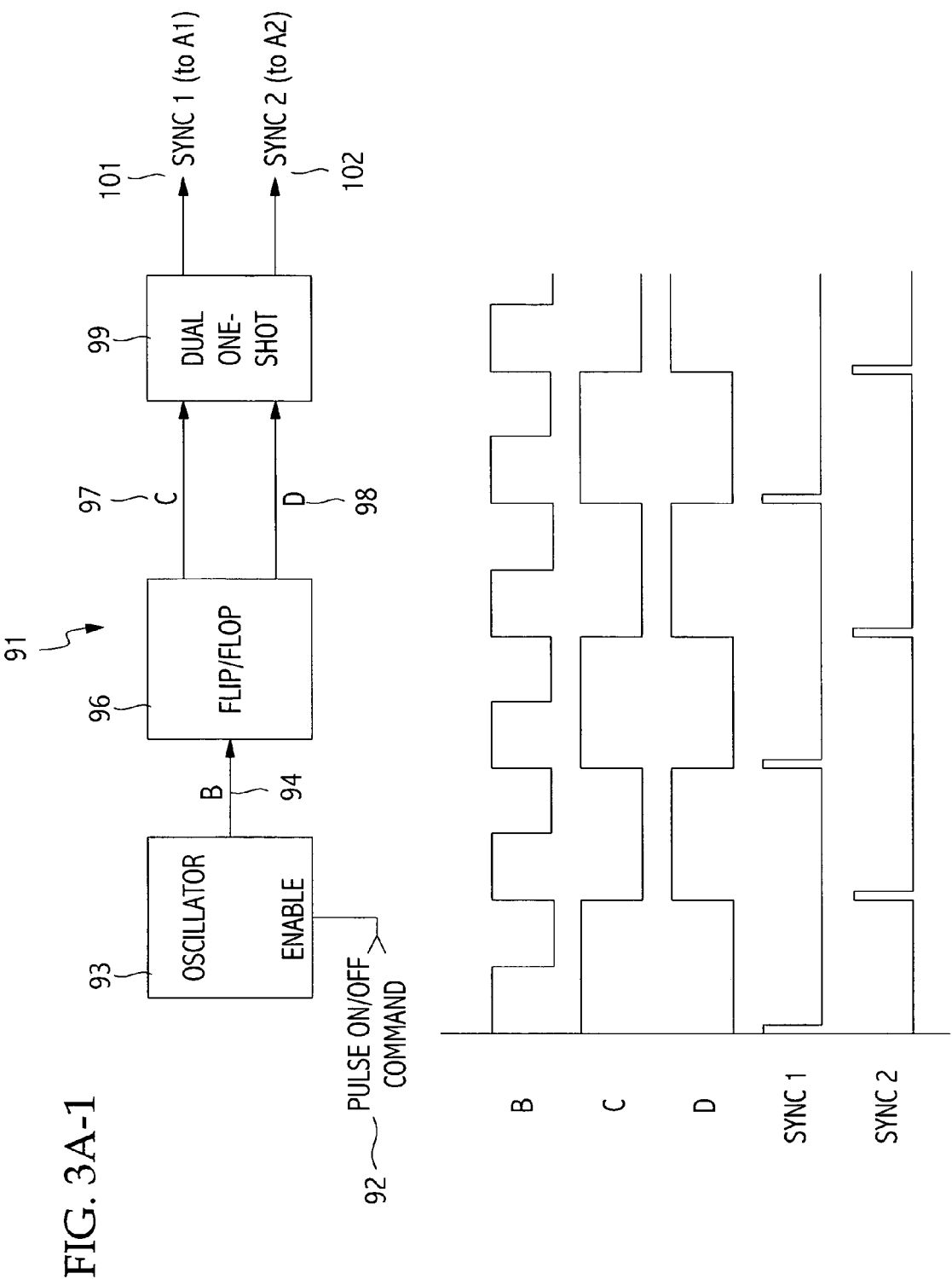

Referring to the drawings for a better understanding of the function and structure of the invention, FIG. 3A shows the preferred embodiment 40 of the present PFC invention. The preferred embodiment consists of 2 Buck switching converter modules each contributing half of the total load current. For clarity, a dashed line 41 surrounds one of the two Buck converter modules in FIG. 3A enclosing the primary elements for Buck converter modules referenced in FIG. 3C. Power switches Q1 (46) and Q2 (47) are shown as power MOSFETs, but may be any suitable power transistor meeting the power and switching demands of the load $V_d$ (48). The load 48 is shown in FIG. 3A as a series string of solid state laser diodes, but can be any type of load requiring pulsed current or voltage. Power switches Q1 46 and Q2 47 require a voltage rating greater than the source voltage Vb and a current rating greater than ½ $i_o$ peak. Diodes D1 53 and D2 54 also require a voltage rating greater than Vb and a current rating greater than ½ $i_o$ peak. Capacitor C1 49 requires a voltage rating greater than Vb.

The individual Buck controller modules A1(51)–A2(52) operate as previously described, but with special synchronization such that they are interleaved and pulse width modulated to control current. Current sensors ("i-sense") 44 and 45 accurately sense current flow at the position in the circuit as shown through the use of a hall effect traducer or other suitable current sensors. Each current sensor has a current rating greater than ½ $i_o$ peak. Controllers A1 and A2 are synchronized so that Q1 turns on at time $t_0$ and Q2 turns on at $t_0$+T/2, with T equal to the pulse width clock period. The synchronization pulses generated by synchronization controller 42 to the 2 modules are set 180 degrees out-of-phase with each other. This causes the load ripple current to sum together in a manner that cancels the ripple to a great degree.

Figure 1:
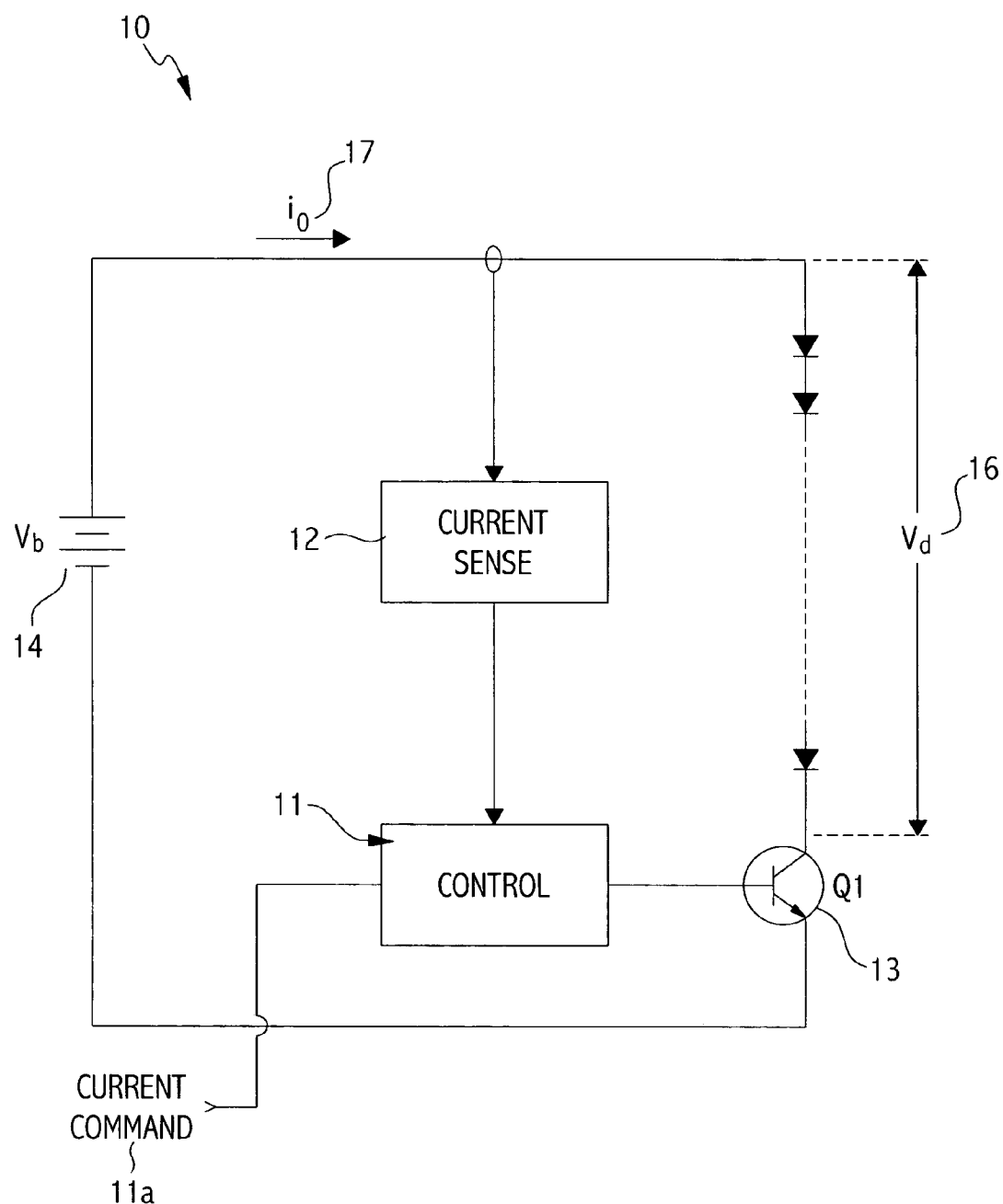
FIG. 1 is a circuit diagram showing the basic elements in a linear pulse generator.

FIG. 3A-1 shows one strategy 91 for implementing the synchronization controller 42 along with waveforms which clarify the controller operation. A load current pulse is initiated by a logic high signal via an ON/OFF command pulse 92 into the enable input of the oscillator 93 as shown. The pulse ON/OFF command 92 stays high for the duration of the output load current pulse. A high frequency pulse train (typically 100 kHz to 10 MHz) B 94 is generated by the oscillator 93 and is sent to a flip/flop 96. The flip/flop 96 generates two signals, C 97 and D 98, which are out of phase. A dual "one-shot" (i.e. a dual monostable multivibrator with Schmitt-trigger input, such as an LS123 IC) 99 receives these signals and generates signal SYNC 1 101 which is a narrow pulse that occurs at the rising edge of signal C 97. The one-shot 99 also generates signal SYNC 2 102 which is a narrow pulse that occurs at the rising edge of signal D 98. SYNC 1 101 and SYNC 2 102 switch the two Buck converters 180 degrees out-of-phase in order to minimize ripple current in the output load pulse. The output load pulse is terminated when the pulse ON/OFF command 92 is set to logic low. A series of output pulses can be generated with programmable pulse widths and duty cycles by switching the pulse ON/OFF command 92 high and low with desired timing. These control commands can be generated in several ways, including microprocessor control, discrete digital logic or with a programmable logic device, as is known.

Theoretically, current ripple is completely cancelled at 50% duty cycle for the 2 converter PFC 40. At duty cycles other than 50%, the ripple current is reduced compared to the individual inductor currents, but is not completely eliminated. The input ripple current is also reduced compared to a single Buck switching converter. This reduces the ripple current requirement on capacitor C1 (49), allowing the use of a smaller capacitor.

The current command signal 43 sets the output pulse amplitude by providing the reference to each Buck converter's internal comparator as described in circuit 20. The pulse amplitude can be programmed to different amplitudes as desired by adjusting the current command voltage. This programming can be done by various means such as adjusting a potentiometer, or from a D-to-A ("digital-to-analog") converter that receives the amplitude setting from a computer, as is known.

An alternate method for controlling pulse width and duty cycle is to set the current command signal 43 to zero, set the power ON/OFF command to logic high, and set the current command signal 43 to the desired command amplitude for a desired pulse width time, then back to zero. This can be repeated at the desired repetition frequency to control duty cycle.

Figure 3B:
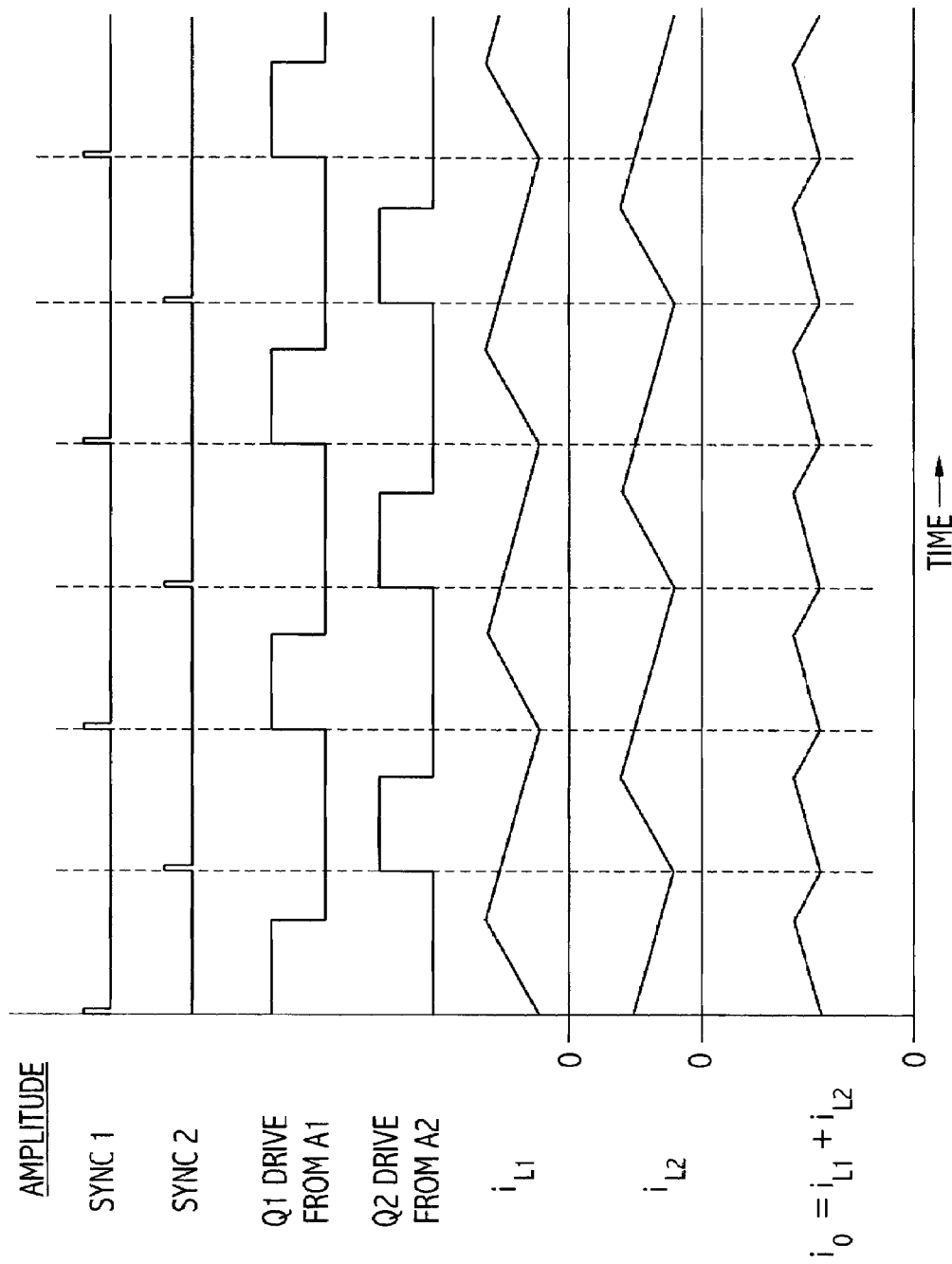
FIG. 3B is a waveform diagram showing expectant signals associated with the circuit shown in FIG. 3A.

The present invention uses the described interleaved converter technique to generate high power pulses with fast rise and fall times, and low ripple currents. For example, if we compare the 2 inductors in the 2 stage PFC 40 to the single inductor in the previously discussed Buck switching converter 20. In general, the weight of the magnetic core in an inductor is proportional to the square of the current in the inductor. By using 2 inductors each operating at half the load current, the sum of the weight of the 2 cores in the 2 stage PFC is ½ the weight of the single core in the equivalent single stage Buck switching converter. Because the 2 inductors are in parallel, the pulse rise time for the 2 stage PFC is half the time for the 1 stage Buck switching converter. FIG. 3B shows typical waveforms resulting from the circuit 40 described in FIG. 3A.

FIG. 3B depicts a snapshot of waveforms in the middle of a pulse with the synchronization controller 42 setting the switching frequencies of Q1(46) and Q2(47) to turn each on when 180° out-of-phase as shown. In response, ripple currents in inductors L1(56) and L2(57) are 180° out-of-phase and output current $i_o(58)$ equals the sum of currents in L1 and L2.

An undesirable phenomenon known as sub-harmonic oscillation can occur in current regulating Buck converters at higher duty cycles. A standard technique applicable to DC to DC Buck converters, adding slope compensation, is effective to prevent this phenomenon in the interleaved Buck converters, such as depicted herein.

Figure 3C:
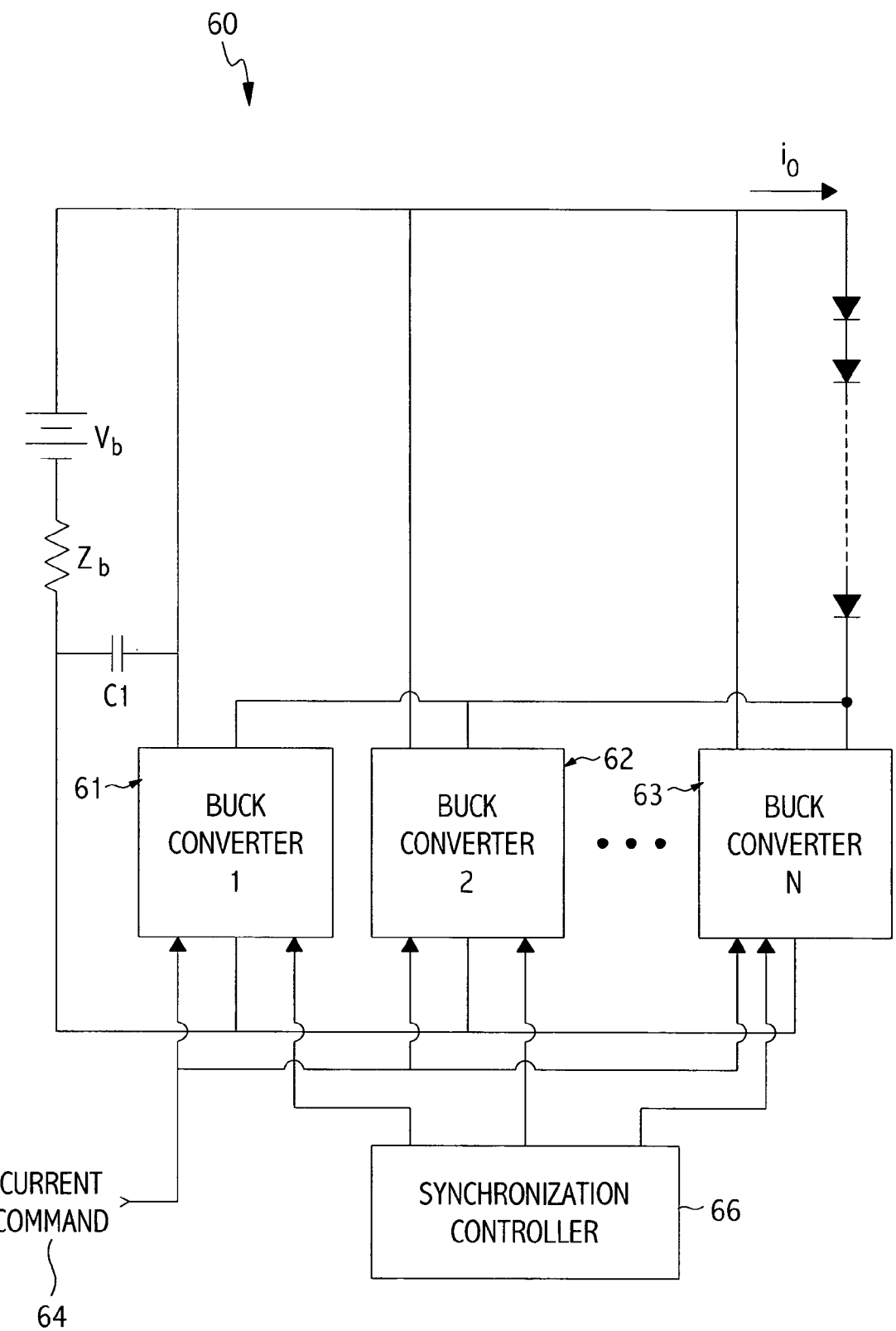
FIG. 3C is a circuit diagram of the embodiment shown in FIG. 3A of the improved pulse forming converter generalized to N phases.
Figures 1, 3C:
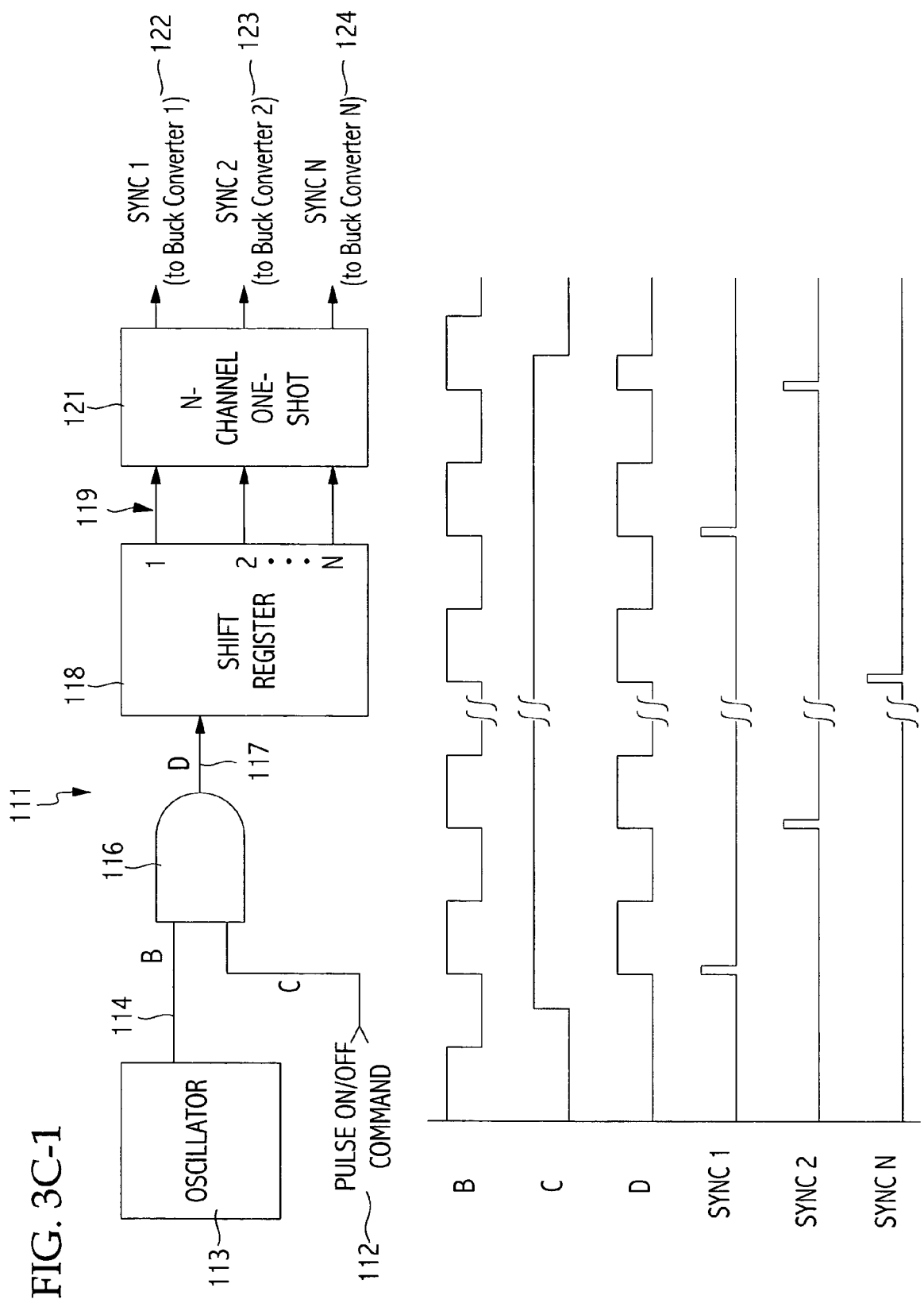

The present invention can be generalized for any number of interleaved converter modules. FIG. 3C shows another embodiment 60 of the invention with N interleaved converter modules. Each module 61–63 is connected as shown and receives current command signals from current command source 64 as in circuit 20. Synchronization pulses are sent to each module from synchronization controller 66 and are out-of-phase with each other so the load ripple current is minimized.

FIG. 3C-1 shows one strategy 111 for implementing the synchronization controller 66 shown in FIG. 3C, along with resultant waveforms during its operation. A load current pulse is initiated by a logic high signal from a pulse ON/OFF command C 112 with the pulse ON/OFF command 112 staying high for the duration of the output load pulse. A high frequency pulse train (typically 100 kHz to 10 MHz) B 114 from the oscillator 113 is passed by an AND gate 116 and a signal D 117 sent to a shift register 118. The shift register 118 has "N" parallel outputs 119 and performs the function of dividing the input frequency of signal D 117 by "N" and time shifting each successive output by one input clock cycle. The N-channel one-shot 121 receives these signals 119 and generates output signals SYNC 1 122, SYNC 2 123, through SYNC N 124 as shown. These sync signals 122–124 are spaced (360/N) degrees out-of-phase in order to minimize ripple current in the output load pulse. The output load pulse is terminated when the pulse ON/OFF command 112 is set to logic low. A series of output pulses can be generated with programmable pulse widths and duty cycles by switching the pulse ON/OFF command 112 high and low with the desired timing. These control commands can be generated in several ways, including microprocessor control, discrete digital logic or with a programmable logic device, as is known. Current command signals are generated from current command source 64 as in circuit 40.

Figure 2:
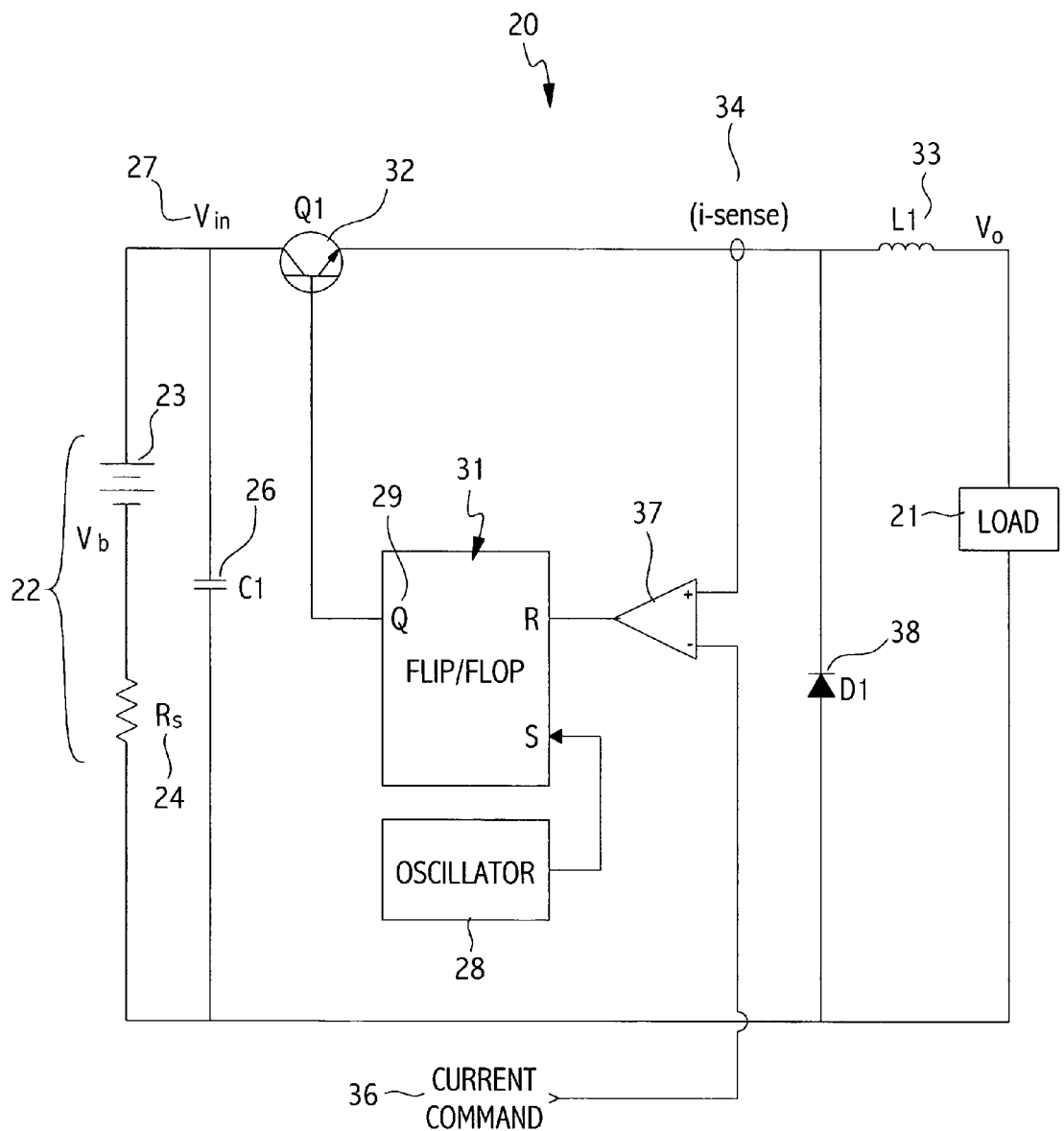
FIG. 2 is a circuit diagram of a common switching converter.

FIG. 3C-2 shows the preferred strategy 131 for implementing the synchronization controller 66 along with waveforms which clarify the controller operation. A load current pulse is initiated via a logic high signal from pulse ON/OFF command B 132 with the command staying high for the duration of the output load pulse (i.e. the pulse propagated through the load). A high frequency clock signal labeled C 134 (typically 100 kHz to 10 MHz) is generated by an oscillator 133. The clock signal C 134 is divided by four in element 137 and sent D 138 to a shift register 139. The shift register 139 has "N" parallel outputs 141 and performs the standard function of dividing the input frequency by "N" and time shifting each successive output by one cycle. The N-phase digital one-shot 142 receives these signals 141 and generates output signals SYNC 1 143, SYNC 2 144 through and including SYNC N 146 as shown. These sync signals 143–146 are spaced (360/N) degrees out-of-phase in order to minimize ripple current in the output load pulse. The output load pulse is terminated when the pulse ON/OFF command 132 is set to a logic low. A series of output pulses can be generated with programmable pulse widths and duty cycles by switching the pulse ON/OFF command 132 high and low with desired timing. These pulse ON/OFF control commands 132 can be generated in several ways, including microprocessor control, discrete digital logic, or with a programmable logic device, as are known.

Figure 4:
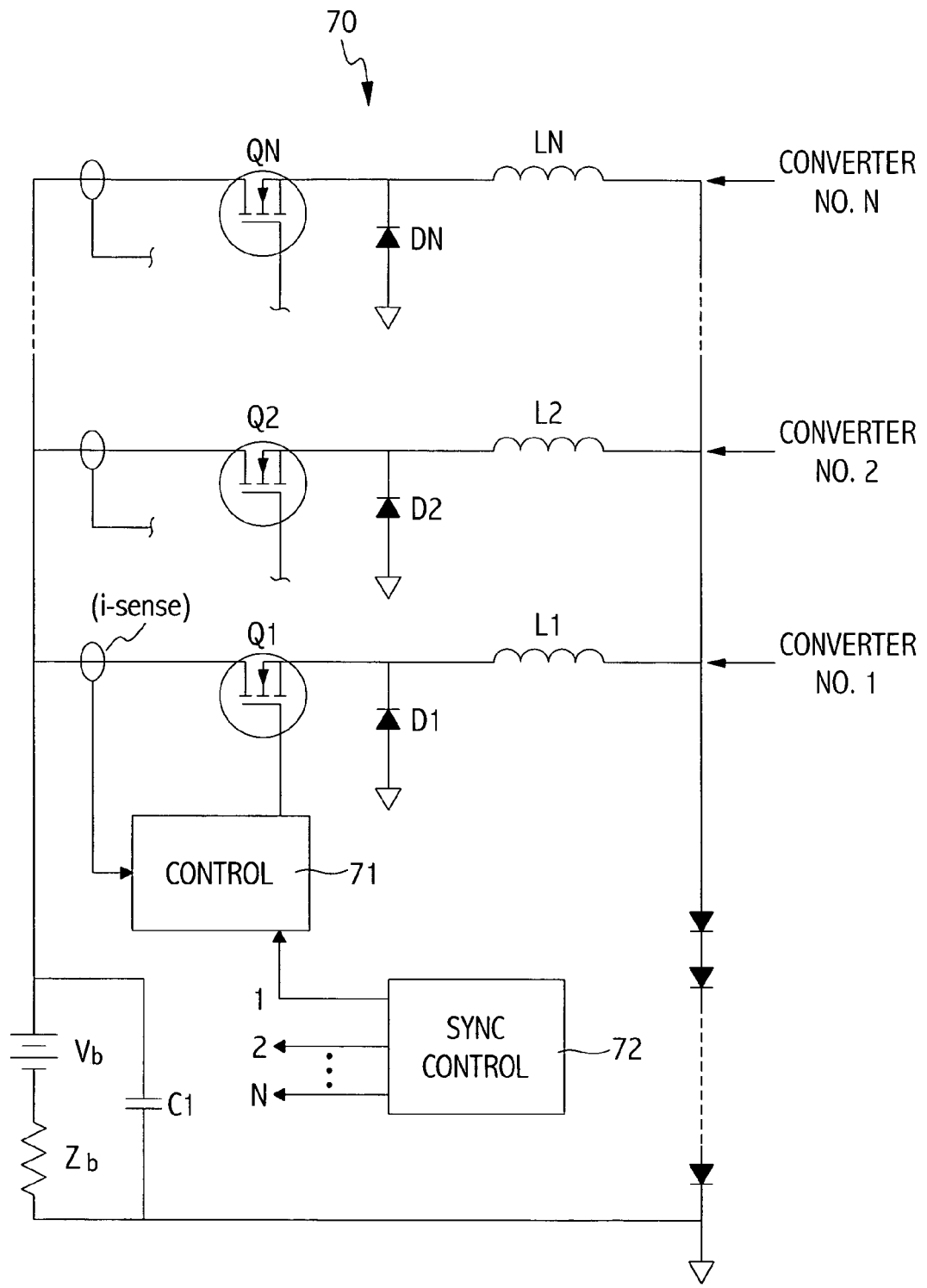
FIG. 4 is a circuit diagram of the embodiment shown in FIG. 3C with the load connected to ground; and, FIG. 5 is a circuit diagram of embodiment shown in FIG. 3C with isolated outputs.

Referring now to FIG. 4, one will see that the circuit shown in FIG. 3C has been reconfigured to permanently connect the load to circuit ground. This configuration 70 is required in some applications for equipment safety or operational reasons. The command controller 71 and sync controller 72 for configuration 70 are the same as for configuration 60 with one modification. Since the power transistors Q1, Q2 through QN are connected to Vb, an isolated transistor driver is needed for each transistor to protect the control circuit from high voltage.

Figure 5:
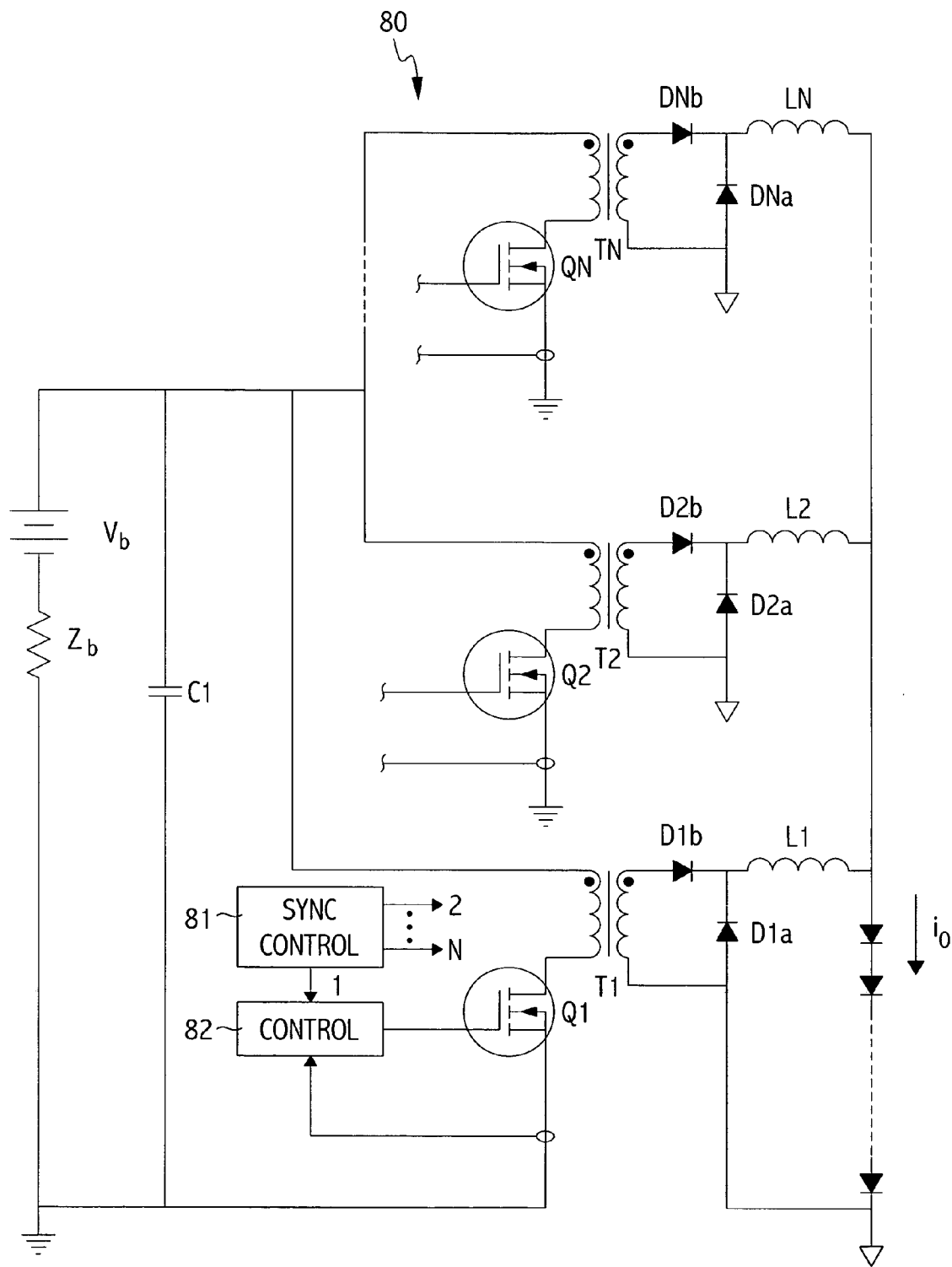

FIG. 5 shows embodiment 60 shown in 3C with outputs isolated. This configuration 80 allows for delivering power pulses to loads that are not or cannot be grounded to the Vb source ground. The command controller 82 and sync controller 81 for configuration 80 are the same as for configuration 60.

Figure 1A:
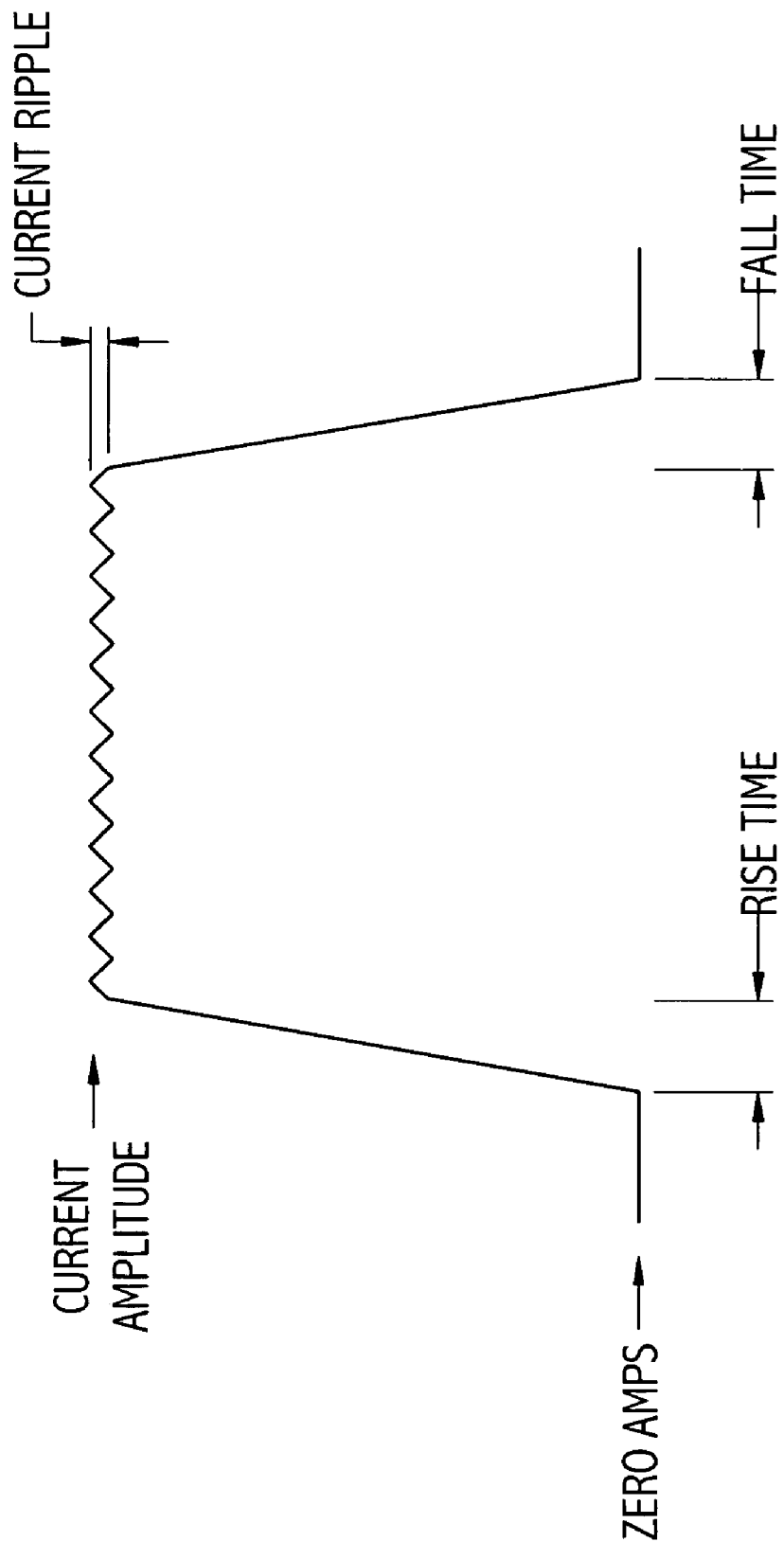
FIG. 1A shows a typical current pulse with portions defined that are important characteristics for a PFC.

Lab observations implementing embodiment 40 shown in FIG. 3A in working prototypes driving laser diode loads resulted in the following values: (1) pulse amplitude is programmable from 35 amps to 55 amps at 90 volts to 160 volts; (2) pulse width is programmable from 50 microseconds to 5 milliseconds; (3) pulse repetition frequency is programmable from 1 Hz to 200 Hz; and (4) rise time and fall time are approximately 20 microseconds each with current ripple of +/−12% maximum. The input voltage Vb ranged from 200 volts to 350 volts (see the definitions in the waveform of FIG. 1A).

Lab observations implementing embodiment 60 shown in FIG. 3C having 5 Buck converter modules and driving laser diode loads resulted in the following values: (1) pulse amplitude is programmable from 90 amps to 140 amps at 90 volts to 160 volts; (2) pulse width is programmable from 50 microseconds to 5 milliseconds; (3) pulse repetition rate is 1 Hz to 200 Hz; (4) rise time and fall time are approximately 20 microseconds each; and (5) current ripple is +/−5% maximum. For this example, the Input voltage Vb ranged from 200 volts to 350 volts (again, see the definitions of the waveform in FIG. 1A).

The successful lab prototypes of embodiment 60 with the 5 interleaved Buck converters (N=5) utilized elements having the following values: the oscillator frequency was 600 kHz, the input filter capacitor C1 was 10 microfarads, inductors L1 through L5 each measured 30 microhenrys, the power transistors (i.e. power MOSFETs) Q1–Q5 and the power diodes D1–D5 each had voltage ratings of 600 volts and current ratings of 50 amps.

The disclosed PFC invention is not limited to the Buck converter topology, but is susceptible to other switching converter topologies used for building DC output power supplies which can be interleaved to form a PFC. These converter topologies include the Forward, Boost, Flyback, Push-Pull, Half-Bridge, Full-Bridge, Sepic and Buck-Boost.

While I have shown my invention in one form, it will be obvious to those skilled in the art that it is not so limited but is susceptible of various changes and modifications without departing from the spirit thereof.

Having set forth the nature of the invention, what is claimed is:

1. A circuit for providing an electrical pulse to a load, comprising:
   a. a first Buck converter circuit;
   b. a second Buck converter circuit connected to said first Buck converter circuit, each said Buck converter circuit adapted to receive a current command signal for establishing an internal reference voltage within each said Buck converter circuit;
   c. means for applying a voltage across said first and said second Buck converter circuits;
   d. a capacitor connected in parallel with said voltage means for reducing ripple in said voltage across said first and said second Buck converter circuits;
   e. a synchronization controller operationally connected to each said Buck converter circuit for initiating electrical pulses in each said Buck converter circuit in interleaved fashion to produce a controllable pulse across said load, and wherein said synchronization controller comprises an oscillator responsively enabled via an on/off command signal; a flip flop connected to an output of said oscillator, said flip flop including dual outputs; and a dual one-shot connected to said dual outputs of said flip flop for generating dual interleaved synchronization signal outputs to said two Buck converters;
   f. wherein said first and second Buck converters are arranged such that a unidirectional current pulse is generated across said load; and,
   g. wherein each said Buck converter circuit is connected to a common load ground and each said Buck converter circuit includes an isolated transistor driver.

2. A circuit for providing an electrical pulse to a load, comprising:
   a. a first Buck converter circuit;
   b. a second Buck converter circuit connected to said first Buck converter circuit, each said Buck converter circuit adapted to receive a current command signal for establishing an internal reference voltage within each said Buck converter circuit;
   c. means for applying a voltage across said first and said second Buck converter circuits;
   d. a capacitor connected in parallel with said voltage means for reducing ripple in said voltage across said first and said second Buck converter circuits;
   e. a synchronization controller operationally connected to each said Buck converter circuit for initiating electrical pulses in each said Buck converter circuit in interleaved fashion to produce a controllable pulse across said load, wherein said synchronization controller comprises an oscillator responsively enabled via an on/off command signal; a flip flop connected to an output of said oscillator, said flip flop including dual outputs; and a dual one-shot connected to said dual outputs of said flip flop for generating dual interleaved synchronization signal outputs to said Buck converters; and,
   f. wherein said first and second Buck converters are arranged such that a unidirectional current pulse is generated across said load;
   g. wherein each said Buck converter circuit has an isolated output such that said load is not grounded to said voltage means;
   h. wherein each said Buck converter circuit comprises:
      i. a load driving transistor;
      ii. a controller operationally connected to said transistor for switching on said transistor, said controller adapted to receive said current command signal and operationally connected to said synchronization controller;
      iii. means operationally connected to said controller for sensing output current levels of said transistor;
      iv. an inductor operationally connected between said voltage means and said load; and,
      v. a diode operationally connected to said voltage means and in parallel with said inductor to permit current flow through said load upon said transistor switching off.

3. A circuit for providing an electrical pulse to a load, comprising:
   a. a first Buck converter circuit;
   b. a second Buck converter circuit connected to said first Buck converter circuit, each said Buck converter circuit adapted to receive a current command signal for establishing an internal reference voltage within each said Buck converter circuit;
   c. means for applying a voltage across said first and said second Buck converter circuits;
   d. a capacitor connected in parallel with said voltage means for reducing ripple in said voltage across said first and said second Buck converter circuits;
   e. a synchronization controller operationally connected to each said Buck converter circuit for initiating electrical pulses in each said Buck converter circuit in interleaved fashion to produce a controllable pulse across said load, wherein said synchronization controller comprises an oscillator responsively enabled via an on/off command signal, a divide by four circuit for dividing said oscillator output by four, a shift register operationally connected to an output of said divide by four circuit and adapted for outputting 1–N pulses in response to said oscillator output, and an N-phase one-shot circuit for receiving outputs from said shift register and outputting 1–N synchronization signals to each said Buck converter;
   f. wherein said first and second Buck converters are arranged such that a unidirectional current pulse is generated across said load; and,
   g. wherein each said Buck converter circuit comprises:
      i. a load driving transistor;
      ii. a controller operationally connected to said transistor for switching on said transistor, said controller adapted to receive said current command signal and operationally connected to said synchronization controller, wherein each said controller comprises an RS flip flop connected to said transistor through its Q output; a comparator having inputs connected to said current sensing means and said current command signal, and having its output connected to an R input of said flip flop; and wherein said flip flop has its S input connected to said synchronization controller;
      iii. means operationally connected to said controller for sensing output current levels of said transistor;
      iv. an inductor operationally connected between said voltage means and said load; and,
      v. a diode operationally connected to said voltage means and in parallel with said inductor to permit current flow through said load upon said transistor switching off.

4. A pulse forming circuit as recited in claim 3, further including additional 3 to N Buck converter circuits each connected to one another and each adapted to receive a current command signal for establishing an internal reference voltage, and each operationally connected to said synchronization controller for initiating electrical pulses in each said Buck converter circuit in interleaved fashion to produce a controllable pulse across said load.

5. A pulse forming circuit as recited in claim 4, wherein said a load driving transistor comprises a power MOSFET.

6. A pulse forming circuit as recited in claim 4, wherein said a load driving transistor comprises a field effect transistor.

7. A pulse forming circuit as recited in claim 4, wherein said a load driving transistor comprises a bipolar transistor.

8. A circuit for providing an electrical pulse to a load, comprising:
   a. first means for converting a voltage source into an electrical pulse;
   b. second means connected to said first pulse means for converting a voltage source into an electrical pulse, each said pulse means adapted to receive a current command signal for establishing an internal reference voltage within each said pulse means;
   c. means for applying a voltage across said first and said second pulse means;
   d. means connected to said voltage means for reducing ripple in said voltage across said first and said second pulse means;
   e. synchronization means connected to each said pulse means for initiating an electrical pulse in each said pulse means in synchronous interleaved fashion such that a pulse of desired characteristics is generated across said load, wherein said synchronization means comprises an oscillator responsively enabled via an on/off command signal, a divide by four circuit for dividing said oscillator output by four, a shift register operationally connected to an output of said divide by four circuit and adapted for outputting 1–N pulses in response to said oscillator output, and an N-phase one-shot circuit for receiving outputs from said shift register and outputting 1–N synchronization signals to each said pulse means; and,
   f. wherein said first and second pulse means are arranged such that a unidirectional current pulse is generated across said load; and,
   g. wherein each said pulse means comprises:
      i. a load driving transistor;
      ii. a controller operationally connected to said transistor for switching on said transistor, said controller adapted to receive said current command signal and operationally connected to said synchronization means, wherein each said transistor controller comprises an RS flip flop connected to said transistor through its Q output; a comparator having inputs connected to said current sensing means and said current command signal, and having its output connected to an R input of said flip flop; and wherein said flip flop has its S input connected to said synchronization means;
      iii. means operationally connected to said controller for sensing output current levels of said transistor;
      iv. means operationally connected between said voltage means and said load for inducing a current in said load upon switching said transistor off; and,
      v. means operationally connected to said voltage means and in parallel with said induction means to provide a current flow path through said load upon said transistor switching off.

9. A pulse forming circuit as recited in claim 8, further including additional 3 to N Buck pulse means each connected to one another and each adapted to receive a current command signal for establishing an internal reference voltage, and each operationally connected to said synchronization means for initiating electrical pulses in each said pulse means in interleaved fashion to produce a controllable pulse across said load.

10. A pulse forming circuit as recited in claim 9, wherein said a load driving transistor comprises a power MOSFET.

11. A pulse forming circuit as recited in claim 9, wherein said a load driving transistor comprises a field effect transistor.

12. A pulse forming circuit as recited in claim 9, wherein said a load driving transistor comprises a bipolar transistor.

13. A method for creating an electrical pulse across a load, comprising the steps of:
   a. applying a voltage across at least two connected Buck converter circuits;
   b. providing a reference voltage to control output pulse amplitude for each said Buck converter circuits, wherein said step of providing a reference voltage to said Buck converter comprises:
      i. initiating an oscillator in response to an on/off command signal;
      ii. receiving a signal into a shifting capable memory element capable of outputting 1–N signals where N is equal to the number of existing Buck converter circuits responsive to signals sent by said oscillator; and,
      iii. receiving outputs from said shifting capable memory element and issuing synchronization signals from a one-shot circuit element to each of said Buck converters;
   c. applying a synchronization signal in an interleaved manner to each said Buck converter;
   d. initiating a pulse from each Buck converter responsive to said synchronization pulse for a specified duration such that a unidirectional pulse of controllable quality is generated across said load, wherein said step of initiation of a pulse from each Buck converter comprises:
      i. receiving said synchronization signal into a control element;
      ii. turning on a load driving element responsive to said reception of said synchronization signal to generate current across said load;
      iii. sensing current level in an output of said load driving element and generating a current level signal responsive thereof;
      iv. comparing said current level signal to a reference signal sent to said Buck converter and generating a signal responsive thereof;
      v. turning off said load driving element conditionally responsive to said signal generated in said comparing step; and,
      vi. repeating steps i–vi to produce a train of desired pulses from said Buck converter; and,
   e. wherein said step of initiating a pulse from each Buck converter further comprises controllably summing each pulse generated by each Buck converter to produce a pulse across said load of desirable quality.

14. A method for creating an electrical pulse across a load, comprising the steps of:
   a. applying a voltage across at least two connected circuits capable of generating a pulse across a load;
   b. providing a reference voltage to control output pulse amplitude for each said pulse circuit, wherein said step of providing a reference voltage to said pulse circuit comprises:
  i. initiating an oscillator in response to an on/off command signal;
  ii. receiving a signal into a shifting capable memory element capable of outputting 1–N signals where N is equal to the number of existing pulse circuits responsive to signals sent by said oscillator; and,
  iii. receiving outputs from said shifting capable memory element and issuing synchronization signals from a one-shot circuit element to each of said pulse circuits;
c. applying a synchronization signal in an interleaved manner to each said pulse circuit; and,
d. initiating a unidirectional pulse from each pulse circuit responsive to said synchronization pulse for a specified duration such that a unidirectional pulse of controllable quality is generated across said load; and,
e. wherein said step of initiating a pulse from each pulse circuit further comprises controllably summing each pulse generated by each pulse circuit to produce a pulse across said load of desirable quality; and,
f. wherein said step of initiation of a pulse from each pulse circuit comprises:
  i. receiving said synchronization signal into a control element;
  ii. turning on a load driving element responsive to said reception of said synchronization signal to generate current across said load;
  iii. sensing current level in an output of said load driving element and generating a current level signal responsive thereof;
  iv. comparing said current level signal to a reference signal sent to said pulse circuit and generating a signal responsive thereof;
  v. turning off said load driving element conditionally responsive to said signal generated in said comparing step; and,
  vi. repeating steps i–vi to produce a train of desired pulses from said pulse circuit.

* * * * *